United States Patent
Stocker (10) Patent No.: US 10,173,524 B2
(45) Date of Patent: Jan. 8, 2019

(54) TRANSFER CASE HAVING A TRACTION ELEMENT OFFSET MECHANISM

(71) Applicant: Magna Powertrain GmbH & Co KG, Lannach (AT)

(72) Inventor: Martin Stocker, Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 342 days.

(21) Appl. No.: 15/240,139

(22) Filed: Aug. 18, 2016

(65) Prior Publication Data

US 2017/0057350 A1    Mar. 2, 2017

(30) Foreign Application Priority Data

Aug. 28, 2015   (DE) .......................... 10 2015 216 497

(51) Int. Cl.
| | |
|---|---|
| B60K 17/342 | (2006.01) |
| B60K 17/346 | (2006.01) |
| B60K 17/02 | (2006.01) |
| B60K 23/08 | (2006.01) |

(52) U.S. Cl.
CPC ............ *B60K 17/342* (2013.01); *B60K 17/02* (2013.01); *B60K 17/346* (2013.01); *B60K 23/08* (2013.01); *B60K 2023/0825* (2013.01)

(58) Field of Classification Search
CPC .... B60K 17/342; B60K 17/346; B60K 23/08; B60K 2013/0825
USPC ...................................................... 74/665 GE
See application file for complete search history.

(56) References Cited

U.S. PATENT DOCUMENTS

| | | | | |
|---|---|---|---|---|
| 5,702,319 A | * | 12/1997 | Baxter, Jr. ......... | B60K 17/3465 418/32 |
| 5,704,863 A | * | 1/1998 | Zalewski ............. | B60K 17/344 180/247 |
| 6,161,643 A | * | 12/2000 | Bober .................... | B60K 17/20 180/197 |

(Continued)

FOREIGN PATENT DOCUMENTS

| | | |
|---|---|---|
| CN | 1036252 A | 10/1989 |
| CN | 1651790 A | 8/2005 |

(Continued)

OTHER PUBLICATIONS

Search Report dated Apr. 28, 2018 issued in corresponding Chinese Patent Application No. 201610736899.2.

*Primary Examiner* — Ha Dinh Ho
(74) *Attorney, Agent, or Firm* — Dickinson Wright PLLC (57) ABSTRACT

A transfer case for a motor vehicle, comprising a housing, an input shaft, a first output shaft, which is arranged substantially coaxially with the input shaft and is operatively drive-connected to the input shaft, a second output shaft, which is arranged offset in relation to the input shaft and which is or can be operatively drive-connected to the input shaft via an offset mechanism, in the form of a flexible traction drive, and via a clutch unit, an actuator unit which serves for actuating the clutch unit, the actuator unit comprising a ramp mechanism having a first ramp disk fixed to the housing and a second, axially displaceable ramp disk, and a carrier shaft which is embodied as a hollow shaft and which at least partially encloses the input shaft, the carrier shaft being rotatably supported on the first ramp disk via a radial bearing.

9 Claims, 5 Drawing Sheets

(56) References Cited

U.S. PATENT DOCUMENTS

| | | | | |
|---|---|---|---|---|
| 6,662,684 | B1 * | 12/2003 | Krisher | F16H 57/028 474/144 |
| 6,994,650 | B2 * | 2/2006 | Allen | F16H 63/3416 475/295 |
| 9,441,726 | B1 * | 9/2016 | Palazzolo | F16H 57/0436 |
| 2004/0020700 | A1 | 2/2004 | Watson et al. | |
| 2005/0098386 | A1 | 5/2005 | Allen et al. | |

FOREIGN PATENT DOCUMENTS

| | | | |
|---|---|---|---|
| CN | 101291835 | A | 10/2008 |
| CN | 101606002 | A | 12/2009 |
| CN | 102758858 | A | 10/2012 |
| CN | 103221720 | A | 7/2013 |
| CN | 103842200 | A | 6/2014 |
| CN | 103991383 | A | 8/2014 |
| EP | 1527937 | A2 | 5/2005 |

\* cited by examiner

TRANSFER CASE HAVING A TRACTION ELEMENT OFFSET MECHANISM

CROSS-REFERENCE TO RELATED APPLICATIONS

This application claims the benefit and priority of German Application No. DE 102015216497.7, filed on Aug. 28, 2015. The entire disclosure of the above application is incorporated herein by reference.

TECHNICAL FIELD

The present invention relates to a transfer case for a motor vehicle having a traction element offset mechanism.

BACKGROUND

This section provides background information relating to the present disclosure which is not necessarily prior art.

Transfer cases are used in particular in motor vehicles with all-wheel drive. They serve to distribute a torque generated by the engine and made available to an input shaft of the transfer case to at least two output shafts of the transfer case, each drive-connected to motor vehicle axles. Along the power flow from the engine of the motor vehicle to the power axle of the motor vehicle the transfer case is usually arranged on the output side of the main gearbox of the engine, which serves to transmit the torque generated by the engine.

A basic distinction is made, according to the type of transfer case, between differential-controlled transfer cases and clutch-controlled transfer cases. In the case of differential-controlled transfer cases either a manually or an automatically lockable differential and/or planetary gear distributes the power flow to two output shafts permanently coupled to the input shaft. In the case of clutch-controlled transfer cases the power flow is distributed to two output shafts by an automatically and/or manually actuated clutch, generally a multi-disk clutch. Here one output shaft of the transfer case, the so-called primary shaft, has a permanently operative drive coupling to the input shaft, and a further output shaft, the so-called secondary shaft, has a drive coupling to the input shaft selectively actuated via the clutch, as and when required. Clutch-controlled transfer cases are also termed "disconnect" transfer cases, since these allow one of the two output shafts of the transfer case to be coupled to/decoupled from the drive shaft.

In addition, hybrid forms are equally known, which comprise both a differential and/or a planetary gear, together with one or more clutches. In such transfer cases the drive torque introduced by way of an input shaft is similarly distributed via the differential and/or planetary gear between at least two output shafts, so that the two output shafts are permanently driven, but a relative rotation is nevertheless allowed between the two output shafts. The clutch here serves for selectively locking the one output shaft to the other output shaft, so that both shafts are forcibly driven.

Transfer cases often comprise an offset mechanism, thereby either giving the output shafts an axial offset in relation to one another and/or giving one or both output shafts an axial offset in relation to an input shaft that is or can be connected to the engine of a motor vehicle. Toothed wheels and/or flexible traction drives are preferably used as offset mechanism.

Flexible traction drives comprise a traction element, which transmits propulsive power between the shafts having an axial offset. Flexible traction drives are preferably used in the form of chain or toothed-belt drives, in which the propulsive power is transmitted via a driving traction element pulley in the form of a toothed wheel, for example, to the traction element, for example a chain or a belt, to a driven traction element pulley, the driving traction element pulley being arranged, for example, on the input shaft and the driven traction element pulley on an axially offset output shaft of a transfer case, for example.

The traction element is typically tensioned between the two traction element pulleys, so that no slip occurs between the two shafts. Acting on the shafts here is a traction element tensile force, which in current transfer cases is transmitted from the driving traction element pulley via various bearings and shafts into the housing of the transfer case and back to the driven traction element pulley again. All the components involved here are exposed to high stress loads. These stress loads must always be taken into account when designing the components and often lead to a greater component outlay and therefore also to an increased cost outlay.

SUMMARY

This section provides a general summary of the disclosure, and is not a comprehensive disclosure of its full scope or all of its features.

The object of the invention, therefore, is to specify an alternative transfer case having a traction element offset mechanism which allows a cost-effective and simple bracing of the tensile force of the traction element.

The object is achieved by a transfer case for a motor vehicle, comprising a housing, an input shaft, a first output shaft arranged substantially coaxially with the input shaft and is operatively drive-connected to the input shaft, a second output shaft arranged offset in relation to the input shaft and which is or can be operatively drive-connected to the input shaft via an offset mechanism in the form of a flexible traction drive and a clutch unit, and an actuator unit which serves for actuating the clutch unit. The actuator unit comprises a ramp mechanism having a first ramp disk fixed to the housing and a second, axially displaceable ramp disk. A carrier shaft which is embodied as a hollow shaft and which at least partially encloses the input shaft is rotatably supported on the first ramp disk via a radial bearing.

The transfer case according to the invention comprises a housing, an input shaft, a first output shaft and a second output shaft.

The input shaft is operatively drive-connected to an engine of the motor vehicle by way of a motor vehicle main transmission and "permanently" transmits propulsive power to the first output shaft and/or the second output shaft of the transfer case.

The first output shaft of the transfer case is operatively drive-connected to a first motor vehicle axle, for example the rear axle of a motor vehicle.

According to the invention the first output shaft is arranged substantially coaxially with the input shaft of the transfer case.

The second output shaft of the transfer case is operatively drive-connected to a second motor vehicle axle, for example the front axle of a motor vehicle.

According to the present invention the second output shaft is arranged offset in relation to the input shaft and is or can be operatively drive-connected to the input shaft by way of an offset mechanism and a clutch unit.

According to the invention the offset mechanism is embodied as a flexible traction drive, that is to say a chain or toothed belt drive.

According to the present invention the transfer case comprises an actuator unit, which serves for actuating the clutch unit.

According to the invention the actuator unit comprises a ramp mechanism.

According to the present invention the ramp mechanism comprises a first ramp disk and a second ramp disk, the first ramp disk being rotationally fixed to the housing of the transfer case and the second ramp disk being axially moveable.

The term "axial" corresponds to a direction along or parallel to a central axis of rotation of the input shaft.

According to the invention the transfer case moreover comprises a carrier shaft. According to the present invention the carrier shaft is embodied as a hollow shaft and at least partially encloses the input shaft of the transfer case.

According to the present invention the carrier shaft is rotatably supported by a radial bearing on the first ramp disk of the ramp mechanism.

The second ramp disk is axially moveable along the carrier shaft relative to the first ramp disk.

The embodiment of the transfer case according to the invention allows the tensile force of the traction element to be transmitted via existing components, without the use of additional components, which serves to optimize the design and economic efficiency of the transfer case.

The offset mechanism is embodied as a flexible traction drive and preferably comprises at least a first traction element pulley, at least a second traction element pulley and a traction element.

For example, the first traction element pulley and the second traction element pulley are designed as toothed wheels with a corresponding, positively interlocking profile, the traction element, for example a chain or a belt, being tensioned via the first traction element pulley and the second traction element pulley.

The first traction element pulley is preferably arranged rotationally fixed on the carrier shaft or is integrally formed with the carrier shaft.

The ramp mechanism of the actuator unit is more preferably arranged in the area between the first traction element pulley of the offset mechanism and the clutch unit.

Such an arrangement of the ramp mechanism gives the transfer case according to the invention an optimum configuration with best possible use of components in the optimum overall space.

Supporting the carrier shaft on the first ramp disk fixed to the housing moreover braces it as directly as possible between the first traction element pulley and the second traction element pulley of the transfer case. According to an advantageous development of the transfer case according to the present invention the first ramp disk of the ramp mechanism of the actuator unit comprises a bearing surface for an axial bearing on the first side face facing the first traction element pulley of the offset mechanism.

The first traction element pulley is preferably supported on the first ramp disk by means of the axial bearing.

The first ramp disk is preferably substantially circular in shape, the radial bearing being arranged annularly in the centre of the first ramp disk.

The first ramp disk more preferably comprises at least three ball tracks in the area of the centre on the second side face facing the second ramp disk.

The first ramp disk preferably comprises radial recesses along its outer circumference.

The formation of radial recesses along the outer circumference serves to optimize the weight of the first ramp disk without at the same time having a negative influence of the working of the ramp disk.

It is advantageous if the first ramp disk is made from a high-strength material.

In an advantageous design variant of the transfer case according to the invention the first ramp disk is connected to the housing on at least two ramp disk portions along its outer circumference.

In a further advantageous design variant of the present invention the first ramp disk has at least one point of support in the area of its outer circumference, in this way preferably supporting a drive shaft of a control motor of the actuator unit.

The embodiment of the transfer case according to the invention is a simple way of bracing the tensile force of the traction element of the offset mechanism.

The use of components such as the first ramp disk of the actuator unit, for example, serving another basic function moreover generates combined effects and obviates the need for additional components, which in turn affords cost-effective production of the transfer case.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
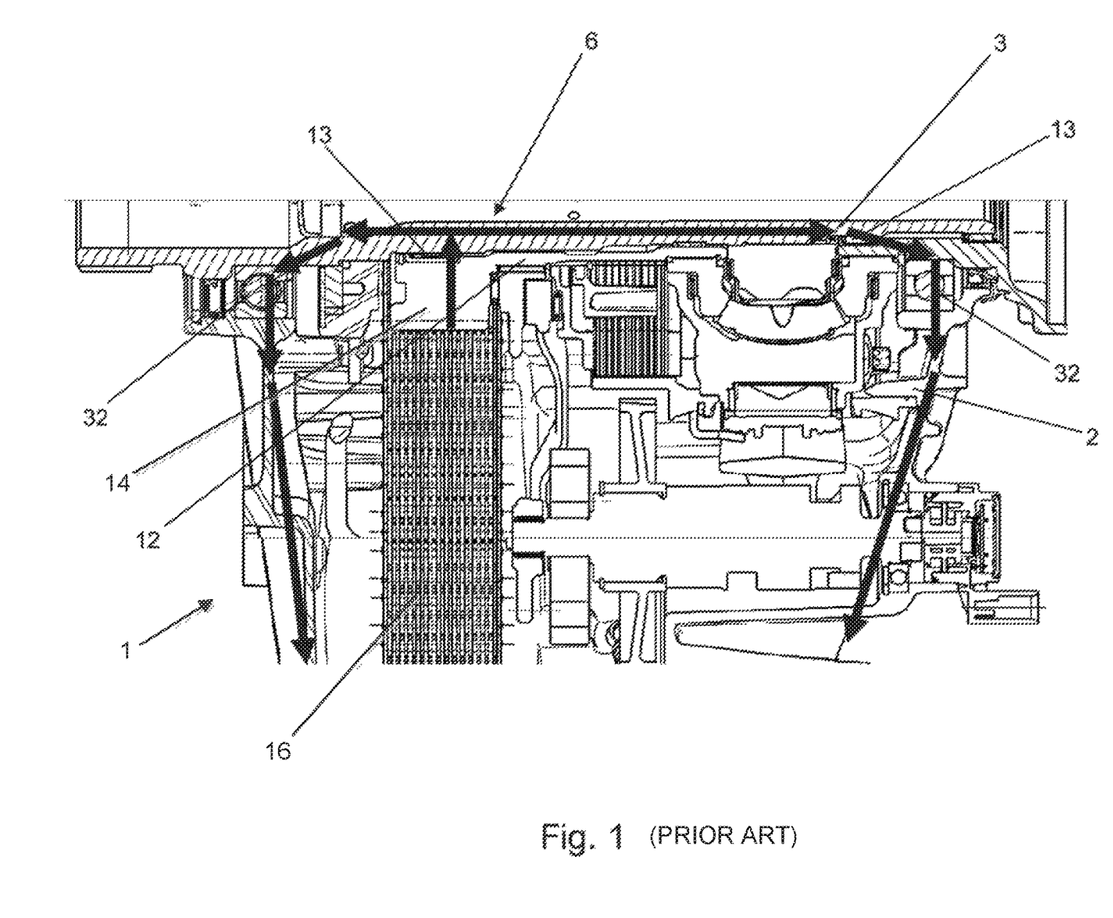
FIG. 1 shows a detailed view of a transfer case in longitudinal section according to the prior art.

FIG. 1 shows a detailed view of a transfer case 1 in a longitudinal section according to the prior art.

The reference numerals corresponding to the components of the present invention have been used to denote the components in the transfer case 1 of prior art represented in FIG. 1.

The transfer case according to the prior art shown in FIG. 1 is not described in detail below—it serves merely as an example representing a generally known way of bracing the tensile force of the traction element 16 of a traction element offset mechanism 6. The transfer case 1 represented in FIG. 1 comprises an input shaft 3 and an offset mechanism 6.

The offset mechanism 6 serves to bridge an offset between the input shaft 3 and a second output shaft 5 (not shown). The offset mechanism 6 is embodied as a chain drive having a first traction element pulley 14 and a second traction element pulley 15 (not shown), each in the form of a toothed wheel. The traction element 16 is a chain. The first traction element pulley 14 is integrally formed with a carrier shaft 12. The first traction element pulley 14/carrier shaft 12 combination is rotatably supported by a radial bearing 13 on the input shaft 3. Such an arrangement serves to brace the tensile force of the traction element 16 according to the arrows represented in FIG. 1.

The bracing of the traction element and therefore the power flow runs from the first traction element pulley 14, via the radial bearing 13 to the input shaft 3, where the power is distributed to left and right along the longitudinal axis of the input shaft 3 in FIG. 1, via further bearings, in particular main bearings 32 of the input shaft 3, into the housing 2 and via main bearings 32 of the second output shaft 5 to the second traction element pulley 15. It can be seen from this that in the solution known in the prior art many components are exposed to high mechanical stresses and that all components have to be dimensioned accordingly, which often leads to a high cost outlay.

Figure 2:
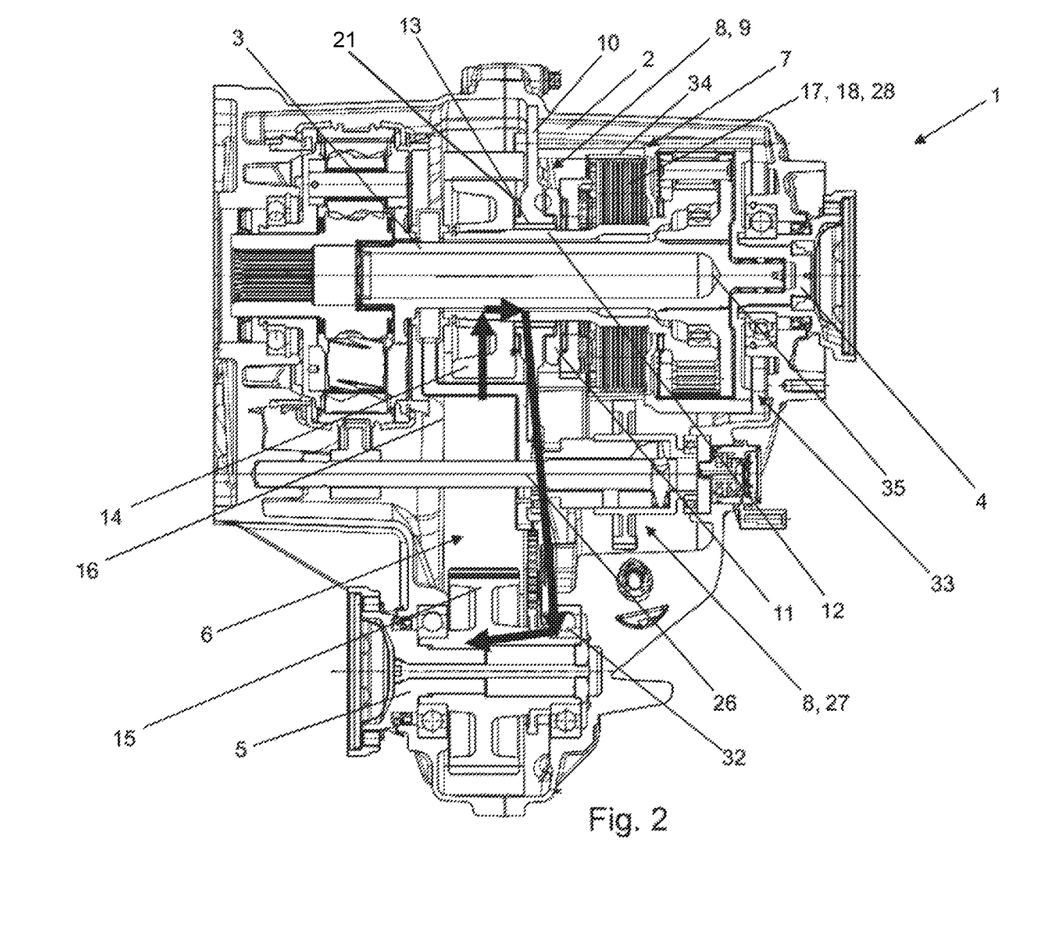
FIG. 2 shows a longitudinal section through a transfer case constructed in accordance with the teachings of the present invention.

FIG. 2 shows a longitudinal section through an exemplary embodiment of a transfer case 1 constructed according to the invention.

The exemplary transfer case 1 represented in FIG. 2 is a hybrid form of a differential-controlled and a clutch-controlled transfer case 1, already described in the description of the present invention. The exemplary transfer case 1 accordingly comprises a differential gear 33, designed as a planetary gear, and a clutch unit 7. The differential gear 33 includes an input member and first and second output members.

The transfer case 1 comprises a housing 2, an input shaft 3, a first output shaft 4 and a second output shaft 5. The input shaft 3 is operatively drive-connected to an engine (not shown) of the motor vehicle by way of a motor vehicle main transmission (not shown) and "permanently" transmits propulsive power to the first output shaft 4 and/or the second output shaft 5 of the transfer case 1 via the input member of the differential gear 33.

The first output shaft 4 of the transfer case 1 is operatively drive-connected to the rear axle of a motor vehicle (not shown). The first output shaft 4 is arranged coaxially with the input shaft 3 of the transfer case 1 and is drive-connected to the first output member of the differential gear 33. The second output shaft 5 of the transfer case 1 is operatively drive-connected to the front axle of a motor vehicle (not shown). The second output shaft 5 is arranged offset in relation to the input shaft 3 and is operatively drive-connected to the latter by way of an offset mechanism 6, a clutch unit 7 and the second output member of the differential gear 33.

The offset mechanism 6 is embodied as a flexible traction drive, in this case as a chain drive. The offset mechanism 6 comprises a first traction element pulley 14, a second traction element pulley 15 and a traction element 16. The first traction element pulley 14 and the second traction element pulley 15 are designed as toothed wheels with a corresponding, positively interlocking profile. The traction element 16, a chain, is tensioned via the first traction element pulley 14 and the second traction element pulley 15.

The first traction element pulley 14 of the offset mechanism 6 of the transfer case 1 is arranged rotationally fixed on a carrier shaft 12. The second traction element pulley 15 of the offset mechanism 6 is connected, rotationally fixed to the second output shaft 5 of the transfer case 1. The propulsive power is transmitted from the first traction element pulley 14 to the traction element 16 and from the traction element 16 to the second traction element pulley 15 and therefore to the second output shaft 5.

The clutch unit 7 serves for locking the first output shaft 4 and the second output shaft 5 of the transfer case 1, so that propulsive power is forcibly transmitted from the input shaft 3 to the first output shaft 4 of the transfer case 1 and to the second output shaft 5 of the transfer case 1. The clutch unit 7 of the transfer case 1 according to the invention is designed as a disk clutch having a plurality of outer disks 17 and a plurality of inner disks 18.

In addition, the transfer case 1 comprises the carrier shaft 12. The carrier shaft 12 is embodied as a hollow shaft and at least partially encloses the input shaft 3 of the transfer case 1. The carrier shaft 12 is operatively drive-connected to the second output member of the differential gear 33. The carrier shaft 12 is rotably supported via a radial bearing 13 on a first ramp disk 10 of a ramp mechanism 9.

The outer disks 17 of the clutch unit 7 of the transfer case 1 are connected to a clutch cage 34, the clutch cage 34 being operatively drive-connected to the differential gear 33. The inner disks 18 of the clutch unit 17 of the transfer case 1 are connected to the carrier shaft 12. The total of all outer disks 17 and inner disks 18 forms a clutch disk pack 28. The outer disks 17 and inner disks 18 are arranged alternately inside the clutch disk pack 28.

The clutch unit 7 can be actuated by an actuator unit 8. The actuator unit 8 comprises the ramp mechanism 9. The ramp mechanism 9 comprises the first ramp disk 10 and a second ramp disk 11, the first ramp disk 10 being rotationally fixed to the housing 2 of the transfer case 1 and the second ramp disk 11 being axially moveable relative to the first ramp disk in the direction of a central axis of rotation 35 of the input shaft 3.

Actuation of the clutch unit 7 by means of the actuator unit 8 compresses the clutch disk pack 28 and a frictional connection is produced between outer disks 17 and inner disks 18, subsequently locking the first output shaft 4 and the second output shaft 5 of the transfer case 1 together.

Figure 3:
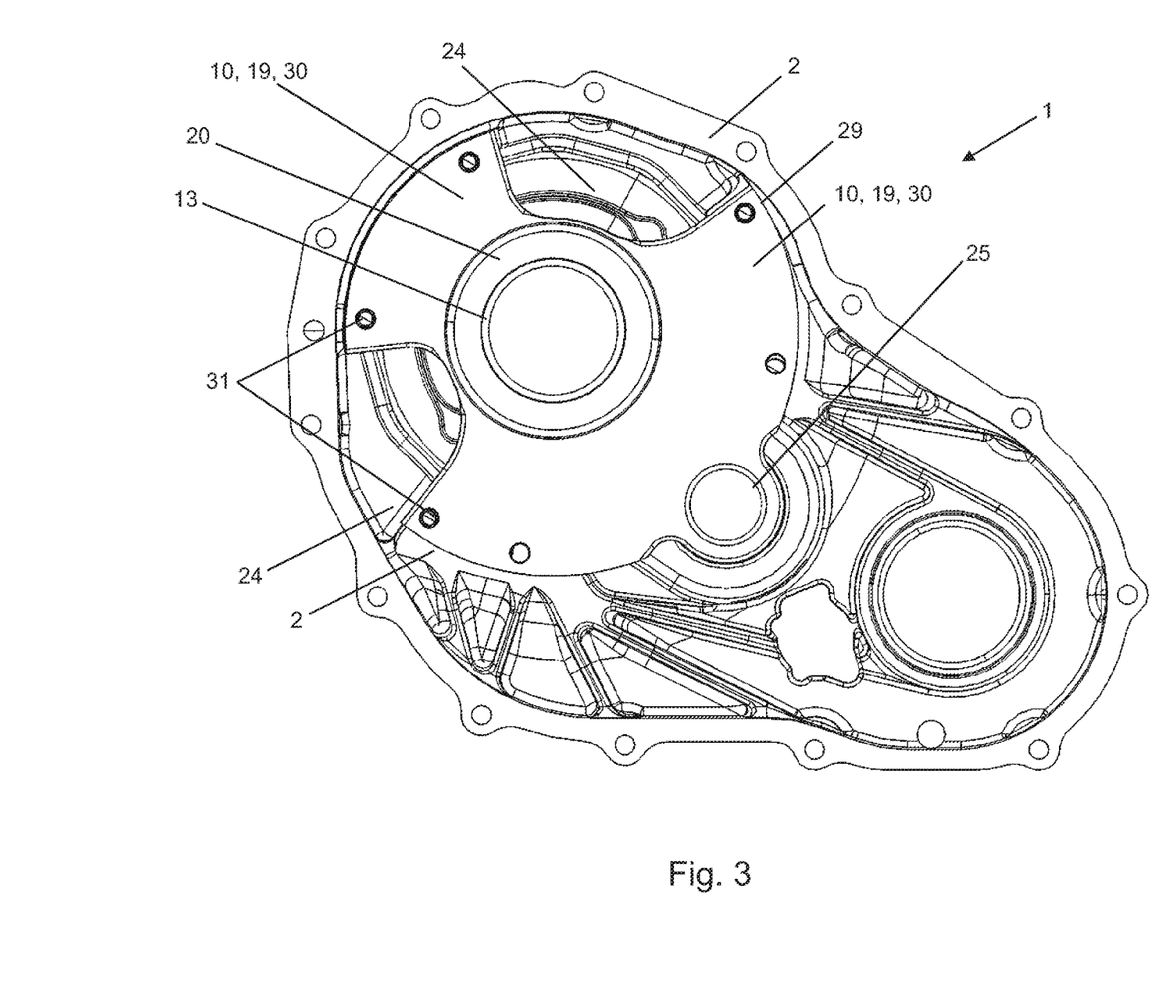
FIG. 3 shows a cross section through the transfer case of FIG. 2.

The ramp mechanism 9 of the actuator unit 8 is arranged in the area between first traction element pulley 14 of the offset mechanism 6 and the clutch unit 7. The first ramp disk 10 of the ramp mechanism 9 of the actuator unit 8 comprises a bearing surface 20 for an axial bearing 21 on the first side face 19 facing the first traction element pulley 14 of the offset mechanism 6 (FIG. 3). The first traction element pulley 14 is supported on the first ramp disk 10 by means of the axial bearing 21.

The arrangement according to the invention serves to brace the tensile force of the traction element 16 according to the arrows shown in FIG. 2. The bracing of the traction element and therefore the power flow runs from the first traction element pulley 14 via the carrier shaft 12 and via the radial bearing 13 to the first ramp disk 10, into the housing 2 and via a main bearing 32 of the second output shaft 5 to the second traction element pulley 15.

The embodiment of the transfer case 1 according to the invention is therefore a simple way of bracing the tensile force of the traction element 16 of the offset mechanism 6.

The use of components serving another basic function moreover generates combined effects and obviates the need for additional components, which in turn affords cost-effective production of the transfer case 1.

FIG. 3 shows a cross section through an exemplary transfer case 1 according to the invention, from which it is in particular possible to see the first side face 19 of the first ramp disk 10 and the fixing of the first ramp disk 10 in the housing 2.

Figure 4:
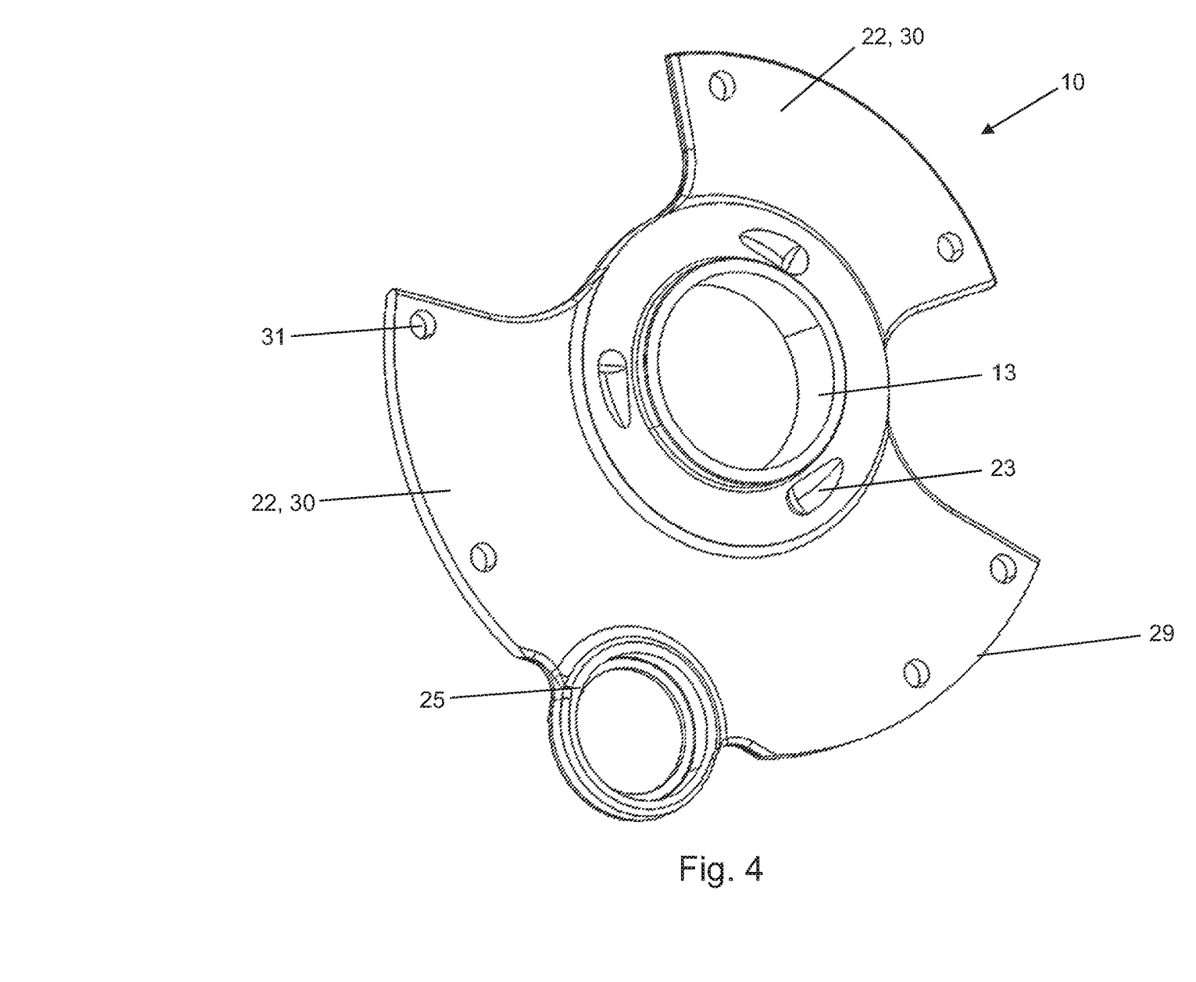
FIG. 4 shows a perspective representation of an embodiment of a first ramp disk of a ramp mechanism of an actuator unit, in particular a second side face.
Figure 5:
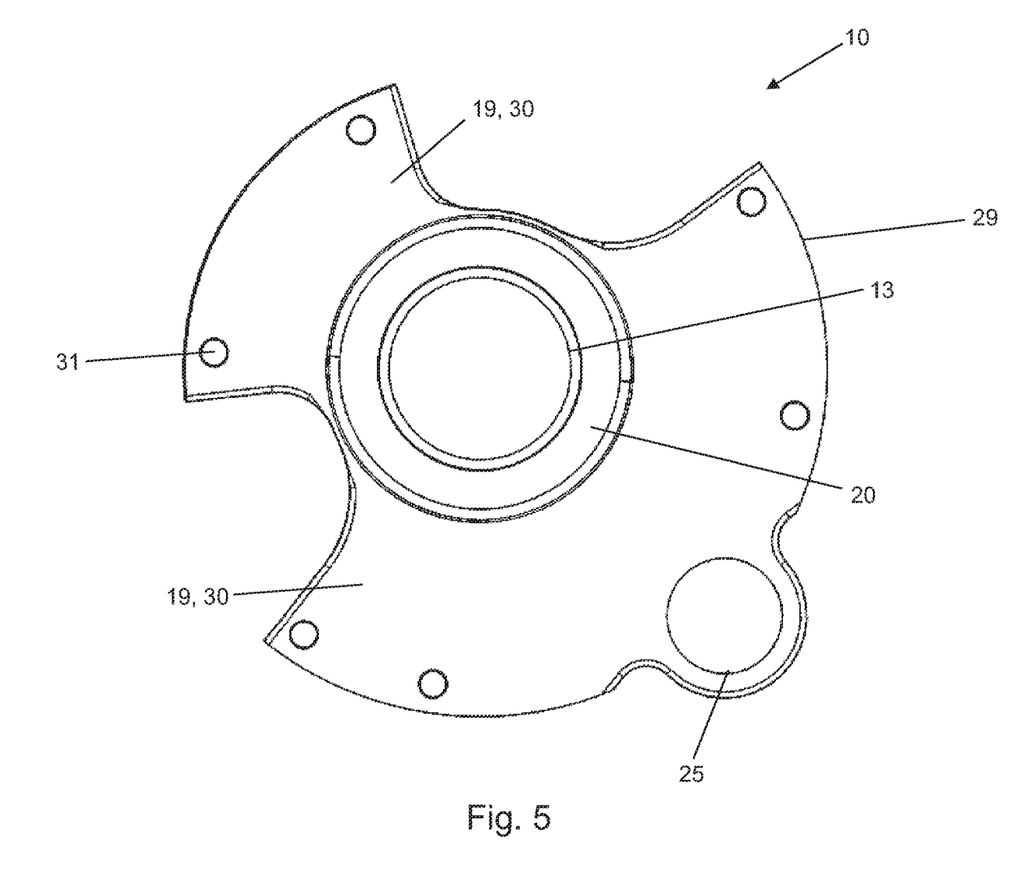
FIG. 5 shows a further representation of an embodiment of a first ramp disk of a ramp mechanism of an actuator unit, in particular a first side face.

FIG. 4 and FIG. 5 show the exemplary design of the first ramp disk 10, shown in FIG. 3, in more detail.

FIG. 4 shows a perspective view of an exemplary embodiment of the first ramp disk 10 of the ramp mechanism 9 of the actuator unit 8 of the transfer case 1, from which it is possible to see the configuration of the first ramp disk 10 on its second end face 22.

FIG. 5 shows an exemplary embodiment of the first ramp disk 10 of the ramp mechanism 9 of the actuator unit 8 of the transfer case 1, from which it is possible to see the configuration of the first ramp disk 10 on its first end face 19.

The first ramp disk 10 is substantially circular in shape, the radial bearing 13 being arranged annularly in the centre of the first ramp disk 10.

The first ramp disk 10 comprises three ball tracks 23 in the area of the centre on the second side face 22 facing the second ramp disk 11. Similar to the three ball tracks 23 on the second side face 22 of the first ramp disk, the second ramp disk 11 comprises three ball tracks 23 (not shown). The ball tracks 23 of the first ramp disk 10 and of the second ramp disk 11 are of varying depth in opposite directions over the circumference of each ramp disk 10, 11. The first ramp disk 10 and the second ramp disk 11 are operatively connected to one another via multiple balls, in particular at least three balls, carried in the ball tracks 23.

Rotation of the second ramp disk 11 by means of a control motor 27 of the actuator unit 8 causes an axial displacement of the second ramp disk 11 relative to the first ramp disk 10, fixed to the housing, therefore subsequently leading to actuation of the clutch unit 7.

The first ramp disk 10 comprises radial recesses 24 along its outer circumference 29. The first ramp disk 10 comprises two fixing bores 31 on each of three ramp disk portions 30 along its outer circumference 29, in order to connect the first ramp disk 10 firmly to the housing 2 of the transfer case 1.

The first ramp disk 10 moreover has a point of support 25 in the area of the outer circumference 29. A drive shaft 26 of the control motor 27 of the actuator unit 8 is rotatably supported via the point of support 25.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SIGNS 1 transfer case
2 housing
3 input shaft
4 first output shaft
5 second output shaft
6 offset mechanism
7 clutch unit
8 actuator unit
9 ramp mechanism
10 first ramp disk
11 second ramp disk
12 carrier shaft
13 radial bearing
14 first traction element pulley
15 second traction element pulley
16 traction element
17 outer disks
18 inner disks
19 first side face
20 bearing surface
21 axial bearing
22 second side face
23 ball tracks
24 recesses
25 point of support
26 drive shaft
27 control motor
28 clutch disk pack
29 outer circumference (of the first ramp disk)
30 ramp disk portion
31 fixing bore
32 main bearing
33 differential gear
34 clutch cage
35 central axis of rotation

What is claimed is:

1. A transfer case for a motor vehicle, comprising:
a housing,
an input shaft,
a first output shaft, which is arranged substantially coaxially with the input shaft and is operatively drive-connected to the input shaft,
a second output shaft, which is arranged offset in relation to the input shaft and which is or can be operatively drive-connected to the input shaft via an offset mechanism, in the form of a flexible traction drive, and via a clutch unit,
an actuator unit which serves for actuating the clutch unit, wherein the actuator unit comprises a ramp mechanism having a first ramp disk fixed to the housing and a second, axially displaceable ramp disk,
a carrier shaft which is embodied as a hollow shaft and which at least partially encloses the input shaft, wherein the carrier shaft is rotatably supported on the first ramp disk via a radial bearing.

2. The transfer case according to claim 1, wherein the offset mechanism comprises a first traction element pulley, a second traction element pulley and a traction element, the first traction element pulley being arranged rotationally fixed on the carrier shaft, and wherein the ramp mechanism of the actuator unit is arranged in the area between the first traction element pulley of the offset mechanism and the clutch unit.

3. The transfer case according to claim 2, wherein the first ramp disk comprises a bearing surface for an axial bearing on a first side face facing the first traction element pulley of the offset mechanism, and wherein the first traction element pulley is supported on the first ramp disk by the axial bearing.

4. The transfer case according to claim 3, wherein the first ramp disk is substantially circular in shape and the radial bearing is arranged annularly in the centre of the first ramp disk.

5. The transfer case according to claim 3, wherein the first ramp disk comprises at least three ball tracks in the area of the centre on a second side face facing the second ramp disk.

6. The transfer case according to claim 1, wherein the first ramp disk comprises radial recesses along its outer circumference.

7. The transfer case according to claim 1, wherein the first ramp disk is made from a high-strength material.

8. The transfer case according to claim 1, wherein the first ramp disk is connected to the housing on at least two ramp disk portions along its outer circumference.

9. The transfer case according to claim 1, wherein the first ramp disk has at least one point of support in the area of its outer circumference, in such a way as to support a drive shaft of a control motor of the actuator unit.

\* \* \* \* \*